United States Patent [19]

Suga et al.

[11] Patent Number: 5,044,331

[45] Date of Patent: Sep. 3, 1991

[54] AIR-FUEL RATIO CONTROL METHOD FOR AN INTERNAL COMBUSTION ENGINE HAVING SPARK PLUGS WITH HEATERS

[75] Inventors: Toshiyuki Suga; Shinichi Kitajima; Horiki Kodama, all of Wako, Japan

[73] Assignee: Honda Motor Co., Ltd., Tokyo, Japan

[21] Appl. No.: 630,071

[22] Filed: Dec. 19, 1990

[30] Foreign Application Priority Data

Dec. 28, 1989 [JP] Japan .................. 1-343220

[51] Int. Cl.$^5$ ................ F02D 41/06; F02D 43/00
[52] U.S. Cl. ................ 123/179 G; 123/169 PB; 123/179 H; 123/491; 123/543
[58] Field of Search .......... 123/179 G, 179 H, 179 L, 123/491, 169 PB, 543

[56] References Cited

U.S. PATENT DOCUMENTS

| | | | |
|---|---|---|---|
| 3,868,939 | 3/1975 | Friese et al. | 123/179 L |
| 4,205,650 | 6/1980 | Szwarcbier | 123/179 H |
| 4,387,676 | 6/1983 | Couceiro | 123/179 G |
| 4,433,665 | 2/1984 | Abe et al. | 123/179 G |
| 4,870,932 | 10/1989 | Asmus | 123/179 H |

FOREIGN PATENT DOCUMENTS 64-8182 2/1989 Japan .

Primary Examiner—Andrew M. Dolinar
Attorney, Agent, or Firm—Arthur L. Lessler

[57] ABSTRACT

An air-fuel ratio control method controls the air-fuel ratio of an air-fuel mixture supplied to an internal combustion engine having spark plugs, and heaters for heating the air-fuel mixture in the vicinity of respective ones of the heaters, the air-fuel mixture containing a fuel which is poor in atomizing characteristic at a low temperature. The method comprises the steps of (1) determining whether or not a temperature of the engine is lower than a predetermined value, (2) determining whether or not the engine is being cranked, (3) detecting an amount of electric current flowing through each of the heaters, and (4) controlling an amount of fuel supplied to the engine based on the detected amount of electric current when it is determined that the temperature of the engine is lower than the predetermined value and at the same time the engine is being cranked.

10 Claims, 6 Drawing Sheets

AIR-FUEL RATIO CONTROL METHOD FOR AN INTERNAL COMBUSTION ENGINE HAVING SPARK PLUGS WITH HEATERS

BACKGROUND OF THE INVENTION

This invention relates to an air-fuel ratio control method applied to an internal combustion engine having spark plugs with heaters, and more particularly to a method of this kind applied to an internal combustion engine to which is supplied a fuel containing methanol, which is poor in atomizing characteristic at a low temperature.

Conventionally, a control system has been proposed e.g. by Japanese Patent Publication (Kokoku) No. 64-8182, which is provided for an internal combustion engine using a mixed fuel of a plurality of kinds of fuels, for correcting the amount of fuel supply, the ignition timing, the amount of recirculation of exhaust gases, etc. depending on the composition of the mixed fuel.

However, when an internal combustion engine using a mixed fuel containing methanol is started at a low temperature, the mixed fuel connot be readily ignited by the spark plug since the mixed fuel is poor in atomizing characteristic at a low temperature. That is, the mixed fuel causes degraded startability of the engine.

Further, if, in order to improve the startability of the engine using a mixed fuel containing methanol when the temperature is low, the amount of fuel to be supplied at the start of the engine is increased irrespective of whether or not the fuel is sufficiently atomized, as is usually carried out in an internal combustion engine using gasoline as fuel, which is excellent in atomizing characteristic, the resulting air-fuel mixture becomes overrich which causes adherence of fuel to the spark plug and hence difficulty to ignite the air-fuel mixture.

SUMMARY OF THE INVENTION

It is an object of the invention to provide an air-fuel ratio control method for an internal combustion engine using a fuel which is poor in atomizing characteristic at a low temperature and having spark plugs with heaters for heating the air-fuel mixture, in which the amount of electric current supplied to the heater and the fuel supply amount are controlled to thereby improve the startability of the engine at a low temperature.

To attain the above object, the present invention provides an air-fuel ratio control method of controlling the air-fuel ratio of an air-fuel mixture supplied to an internal combustion engine having spark plugs, and heaters for heating the air-fuel mixture in the vicinity of respective ones of the heaters, the air-fuel mixture containing a fuel which is poor in atomizing characteristic at a low temperature.

The air-fuel ratio control method according to the invention is characterized by comprising the steps of:

(1) determining whether or not a temperature of the engine is lower than a predetermined value;

(2) determining whether or not the engine is being cranked;

(3) detecting an amount of electric current flowing through each of the heaters; and (4) controlling an amount of fuel supplied to the engine based on the detected amount of electric current when it is determined that the temperature of the engine is lower than the predetermined value and at the same time the engine is being cranked.

Preferably, the amount of fuel supplied to the engine is decreased when the detected amount of electric current is increasing.

Also preferably, before starting cranking of the engine, electric current is supplied to the each heater for preheating the air-fuel mixture in the vicinity of the each heater.

The above and other objects, features, and advantages of the invention will become more apparent from the ensuing detailed description taken in conjunction with the accompanying drawings.

DETAILED DESCRIPTION

The invention will now be described in detail with reference to the drawings showing an embodiment thereof.

Figure 1:
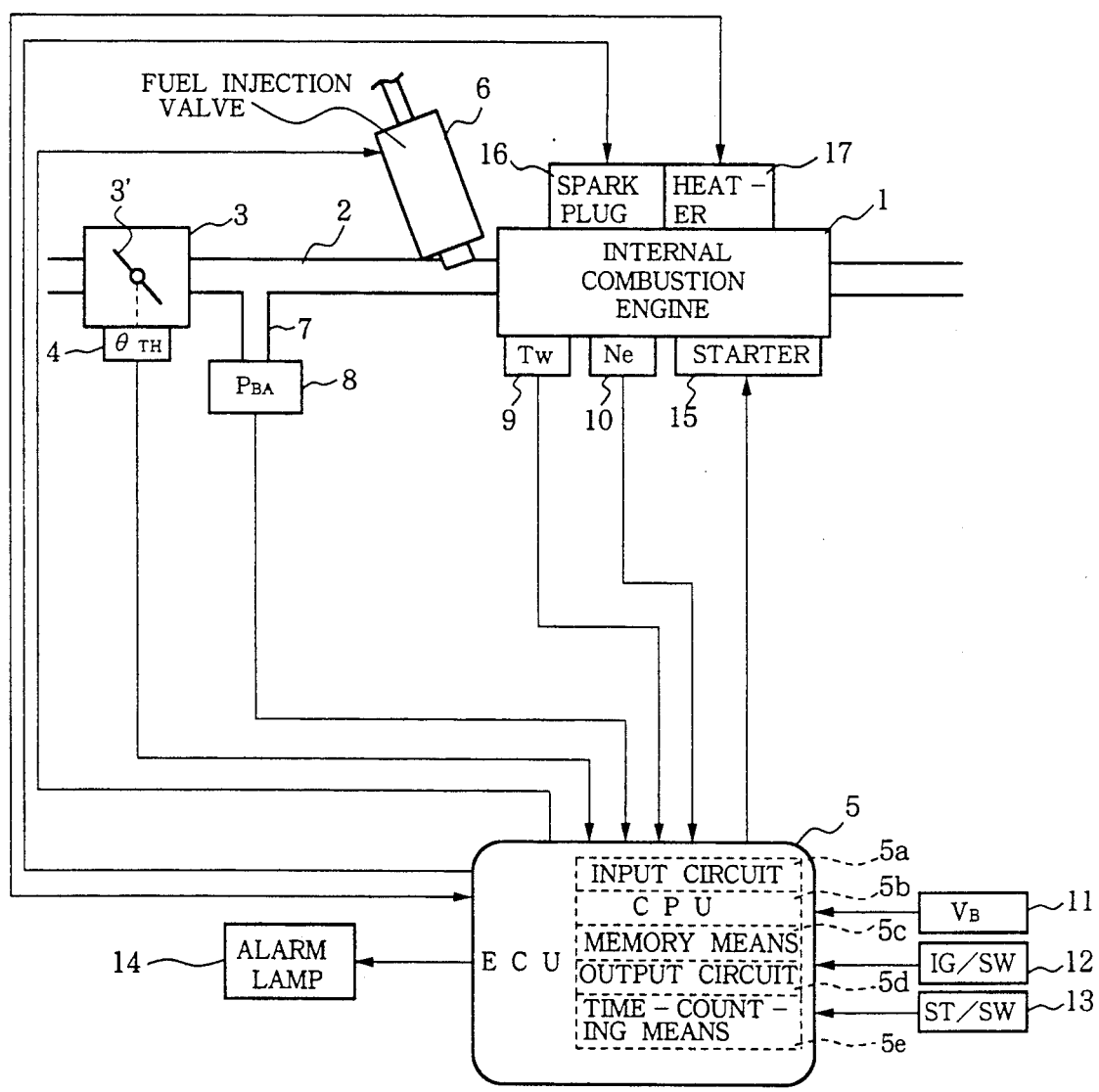
FIG. 1 is a schematic diagram of the whole arrangement of an engine control system to which is applied the air-fuel ratio control method according to the invention.

Referring first to FIG. 1, there is shown the whole arrangement of an engine control system to which is applied the air-fuel ratio control method according to the invention. In the figure, reference numeral 1 designates an internal combustion engine for automotive vehicles. Connected to the cylinder block of the engine 1 is an intake pipe 2 across which is arranged a throttle body 3 accommodating a throttle valve 3' therein. A throttle valve opening ($\theta_{TH}$) sensor 4 is connected to the throttle valve 3' for generating an electric signal indicative of the sensed throttle valve opening and supplying same to an electronic control unit (hereinafter called "the ECU") 5.

Fuel injection valves 6, only one of which is shown, are inserted into the interior of the intake pipe at locations intermediate between the cylinder block of the engine 1 and the throttle valve 3' and slightly upstream of respective intake valves, not shown. The fuel injection valves 6 are connected to a fuel pump, not shown, and electrically connected to the ECU 5 to have their valve opening periods controlled by signals therefrom.

On the other hand, an intake pipe absolute pressure ($P_{BA}$) sensor 8 is provided in communication with the interior of the intake pipe 2 at a location immediately downstream of the throttle valve 3' for supplying an electric signal indicative of the sensed absolute pressure within the intake pipe 2 to the ECU 5.

An engine coolant temperature ($T_W$) sensor 9, which may be formed of a thermistor or the like, is mounted in the cylinder block of the engine 1, for supplying an electric signal indicative of the sensed engine coolant temperature $T_W$ to the ECU 5. An engine rotational speed (Ne) sensor 10 is arranged in facing relation to a camshaft or a crankshaft of the engine 1, neither of which is shown. The engine rotational speed sensor 10 generates a pulse as a TDC signal pulse at each of predetermined crank angles whenever the crankshaft rotates through 180 degrees, the pulse being supplied to the ECU 5.

Connected to the ECU 5 is a battery voltage sensor 11 for detecting a battery voltage ($V_B$), and a signal indicative of a detected value of the battery voltage ($V_B$) is supplied to the ECU 5. Also connected to the ECU 5 are an ignition switch sensor 12 and a starter switch sensor 13 for detecting the closure of an ignition switch (IG/SW) and a starter switch (ST/SW), respectively, and signals indicative of the closure of respective switches are supplied to the ECU 5.

An alarm lamp 14 is connected to the ECU 5 to be supplied therefrom with a lamp-lighting signal when there occurs an abnormality, such as disconnection in a heater 17, referred to hereinafter, to thereby notify the driver of the abnormality.

A starter 15 is mechanically connected to the crankshaft of the engine 1 and electrically connected to the ECU 5, for driving the crankshaft in response to a driving signal from the ECU 5 to thereby start the engine 1.

Further, a spark plug 16, which is provided for each cylinder of the engine 1, is connected to the ECU 5 via an ignition circuit, not shown, and has its ignition timing controlled by a signal from the ECU 5.

A heater 17, which is provided for each of the spark plugs 16, is connected to the ECU 5 via a heater current-supplying circuit, not shown, and the supply of electric current to the heater 17 is carried out or stopped by a signal from the ECU 5. Further, an amount of electric current supplied to the heater 17 is detected thereat, and a signal indicative of the detected amount of electric current is supplied to the ECU 5.

Figure 2:
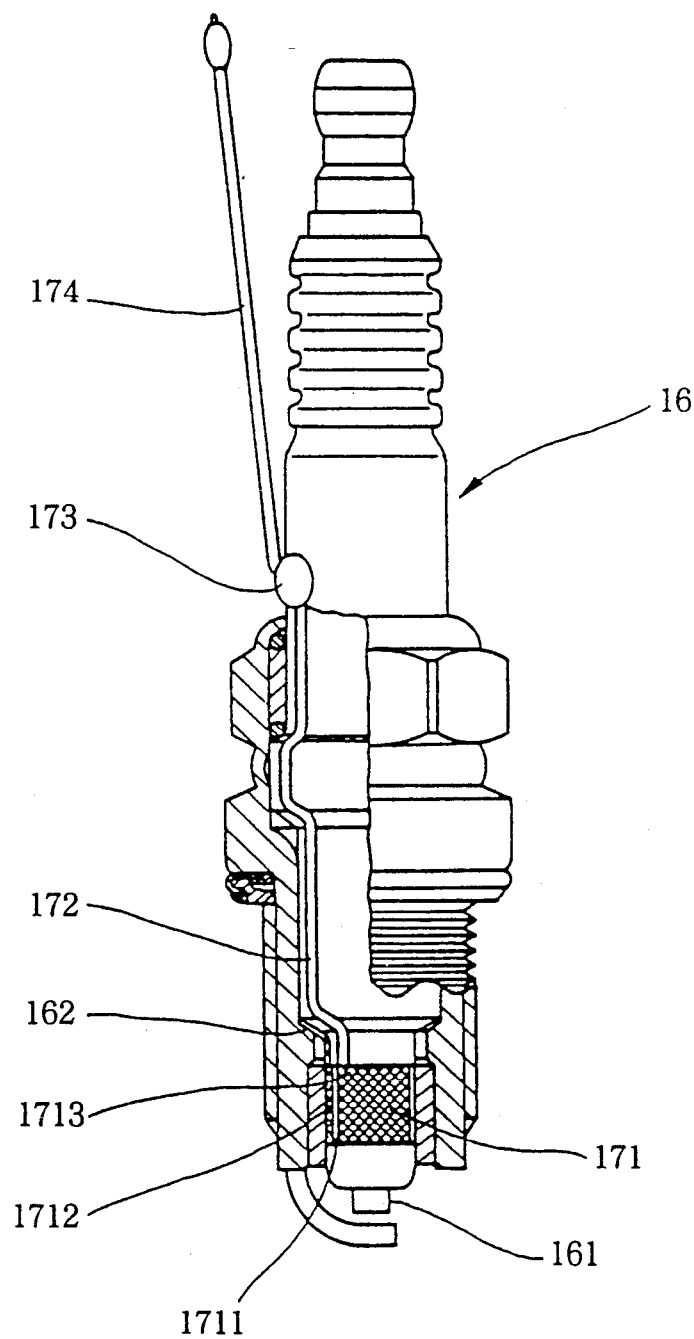
FIG. 2 is a longitudianl cross-sectional view of a spark plug and a heater appearing in FIG. 1.

FIG. 2 shows the construction of the heater 17 provided for the spark plug 16. A heater element 171 formed of a ceramic heater is arranged in the vicinity of an ignition spark-forming portion 161 of the ignition plug 16. The heater element 171 is in the form of a hollow cylinder having an elongate cutout 1711 and formed of a plularity of heating resistances arranged in a regular pattern and connected in parallel with each other. One end 1712 of the heater element 171 is connected to a stepped shoulder 162 of the spark plug 16, i.e. grounded, and the other end 1713 is connected to a lead wire 174 via a lead 172 and a soldered portion 173. The lead wire 174 is connected to the aforementioned heater current-supplying circuit.

Referring again to FIG. 1, the ECU 5 comprises an input circuit 5a having the functions of shaping the waveforms of input signals from various sensors, shifting the voltage levels of sensor output signals to a predetermined level, converting analog signals from analog-output sensors to digital signals, and so forth, a central processing unit (hereinafter called "the CPU") 5b for calculating the fuel supply amount, ignition timing, etc. based on various signals indicative of engine operating parameters, and for determining timing for energizing the heater, memory means 5c storing various operational programs which are executed in the CPU 5b and for storing results of calculations therefrom, etc., an output circuit 5d which outputs driving signals to the fuel injection valves 6, the spark plugs 16, the heaters 17, the starter 15, and the alarm lamp 14, time-counting means 5e for couting time having elapsed after the start of the engine, etc.

The CPU 5b operates in response to the above-mentioned engine operating parameter signals from the sensors to determine operating conditions in which the engine 1 is operating, and calculates, based upon the determined operating conditions, the valve opening period or fuel injection period $T_{OUT}$ over which the fuel injection valves 6 are to be opened, by the use of the following equation (1) when the engine is controlled in a normal mode, in synchronism with inputting of TDC signal pulses to the ECU 5:

$$T_{OUT} = T_i \times K_1 + K_2 \qquad (1)$$

where $T_i$ represents a basic value of the fuel injection period $T_{OUT}$ of the fuel injection valve 6, which is read from a Ti map set in accordance with the engine rotational speed Ne and the intake pipe absolute pressure $P_{BA}$.

$K_1$ and $K_2$ are other correction coefficients and correction variables, respectively, which are calculated based on various engine operating parameter signals to such values as to optimize various characteristics of the engine such as fuel consumption and accelerability depending on operating conditions of the engine.

The CPU 5b calculates the fuel injection period $T_{OUT}$ of the fuel injection valves 6 by the use of the following equation (2) when the engine is controlled in a starting mode:

$$T_{OUT} = T_{iCR} \times K_{Ne} + K_3 \qquad (2)$$

where $T_{iCR}$ represents a basic value of the fuel injection period $T_{OUT}$ used when the engine is started, and read from a $T_{iCR}$ map based on the engine coolant temperature $T_W$. $K_{Ne}$ is a correction coefficient for increasing the basic value $T_{iCR}$ based on the engine rotational speed Ne. $K_3$ is other correction variables, e.g. for correction dependent on the battery voltage.

The CPU 5b supplies through the output circuit 5d the fuel injection valves 6 with driving signals corresponding to the fuel injection period $T_{OUT}$ calculated as above, over which the fuel injection valves 6 are opened.

Figure 3A:
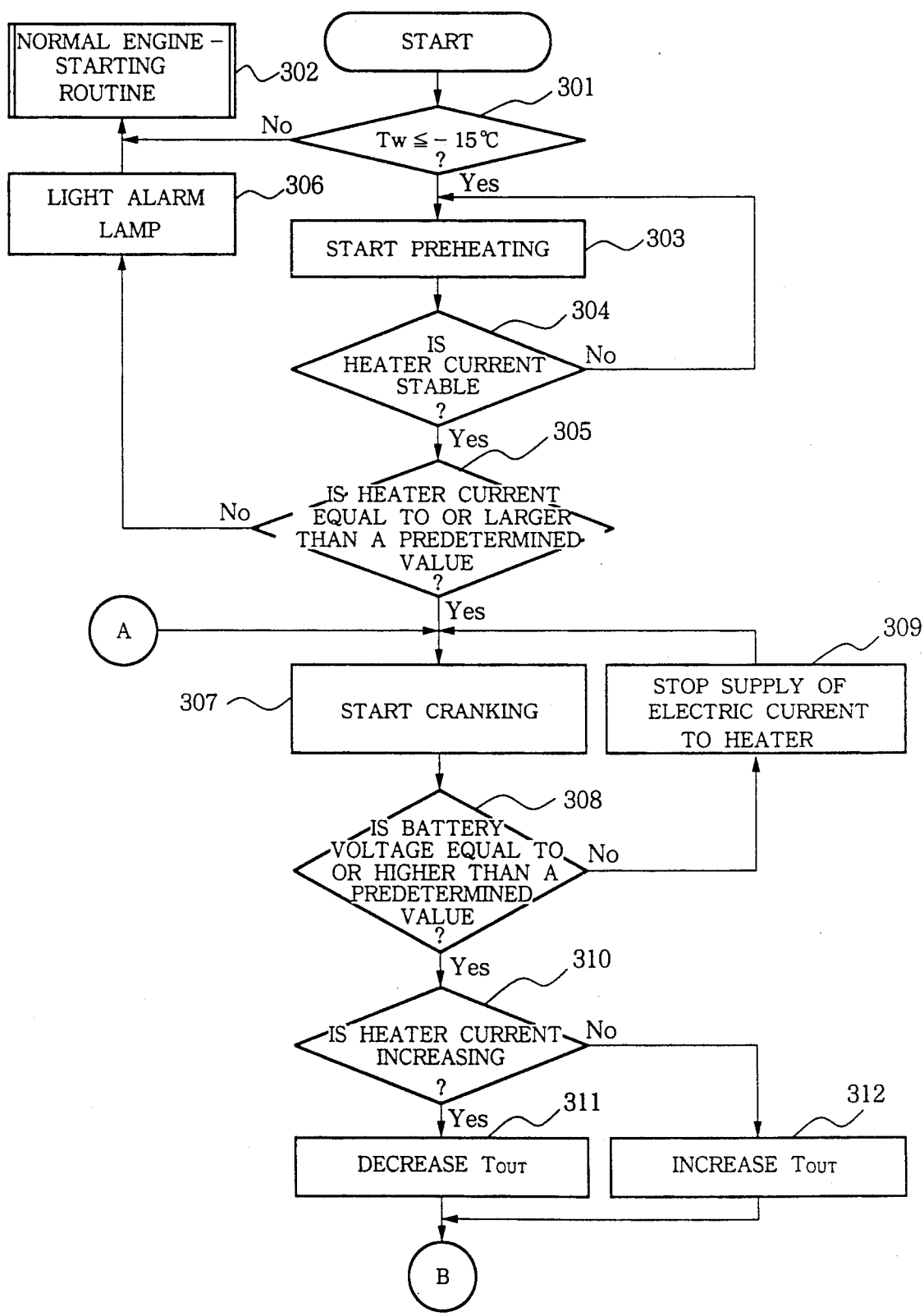
FIG. 3 is a flowchart of a program carried out by a CPU appearing in FIG. 1 for controlling the amount of electric current supplied to the heater.
Figure 3B:
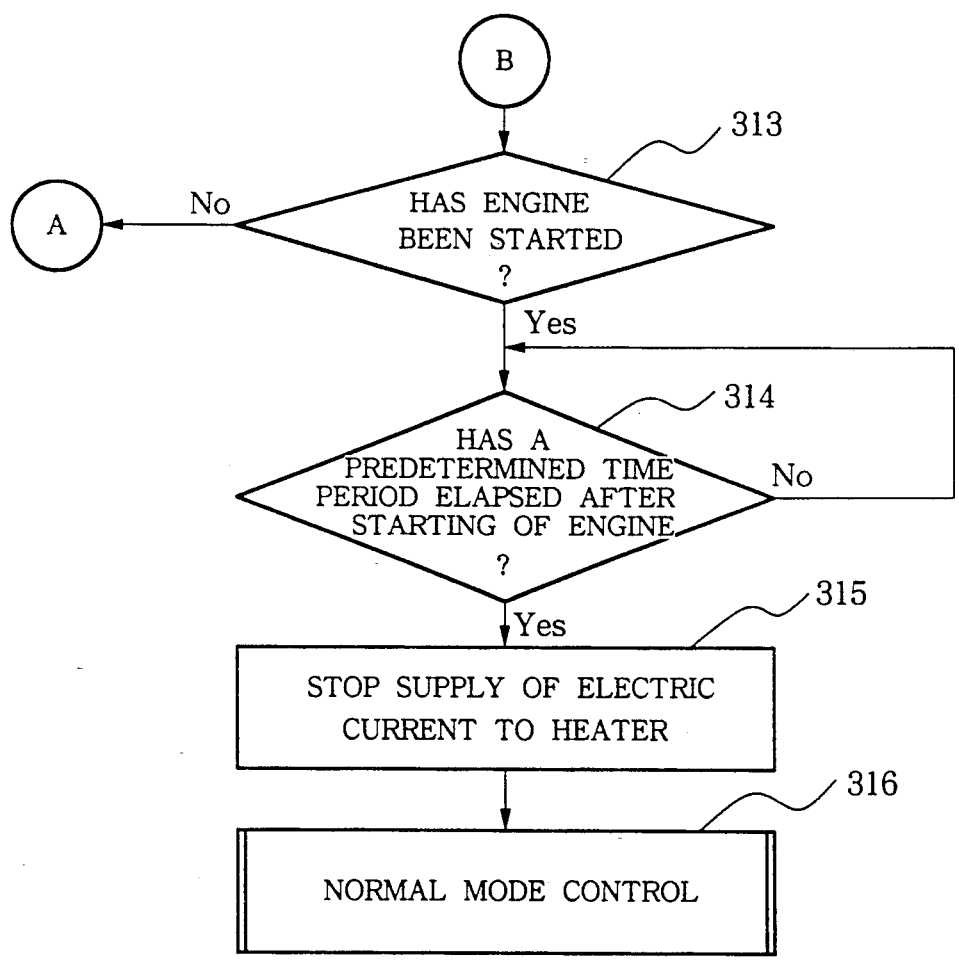

Next, the control of heater current supplied to the heater 17, which is carried out by the CPU 5b, will be described with reference to a program shown in FIG. 3.

This program is started when the ignition switch sensor 12 detects closure of the ignition switch for the first time.

First, at a step 301, it is determined whether or not the engine coolant temperature $T_W$ detected by the engine coolant temperature sensor 9 is equal to or lower than a predetermined value (e.g. $-15°$ C.). This stpe is for determining whether the engine is in a low temperature condition in which the startability of the engine using a fuel containing methanol is degraded.

If the answer to this question is negative (No), i.e. if the engine is not in the low temperature condition in which the startability of the methanol fuel engine is degraded, the program proceeds to a step 302, where the fuel injection period $T_{OUT}$ is calculated by the use of the equation (2), and based on the calculated fuel injection period $T_{OUT}$, a known normal engine-starting routine control is carried out.

If the answer to the question of the step 301 is affirmative (Yes), i.e. if the engine is in the low temperature condition in which the startability of the methanol fuel engine is degraded, the supply of electric current to the heater 17 is started to thereby preheat a mixture in the vicinity of the spark plug 16 at a step 303.

Figure 4:
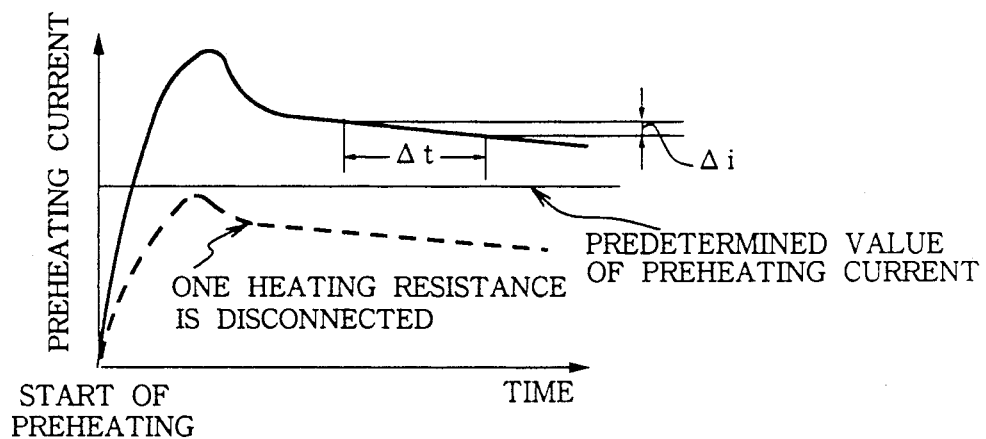
FIG. 4 is a graph illustrating a change in preheating electric current with the lapse of time.

FIG. 4 shows changes in the electric current (preheating current) supplied to the heater 17 immediately after the electric current supply to same is started. Normally, the heater current changes as shown by the solid line in the figure. In other words, a large amount of current (rush current) flows through the heater 17 when voltage starts to be applied thereto, since the heater 17 then exhibits a low resistance value. Then, the heater current progressively decreases to a constant value in the vicinity of a predetermined value. If one of the heating resistances connected in parallel forming the heater 17 is disconnected, the amount of preheating current supplied to the heater 17 does not reach the predetermined value, showing a change as indicated by the broken line in the figure.

Therefore, at a step 304 following the step 303, it is determined whether or not an amount $\Delta i$ (absolute value) of change in the preheating current within a very small time period $\Delta t$ is smaller than a predetermined value C to thereby determine whether or not the preheating current has become stable. If the answer to this question is negative (No), i.e. if $\Delta i/\Delta t \geq C$, which means that the preheating current is not stable, the program returns to the step 303, where the supply of electric current to the heater 17 is continued to thereby continue preheating of the air-fuel mixture in the vicinity of the spark plug 16. On the other hand, if the answer to the question of the step 304 is affirmative (Yes), i.e. if $\Delta i/\Delta t < C$, which means that the preheating current is stable, the program proceeds to a step 305. In this connection, the step 304 may be replaced by a step for allowing the program to proceed to the step 305 only after a predetermined time period for preheating, which starts to be counted after the start of preheating, has elapsed.

At the step 305, it is determined whether or not the preheating current (heater current) is equal to or larger than the predetermined value. If the answer to this question is negative (No), i.e. if the preheating current (heater current) does not reach the predetermined value, which means that one or more of the heating resistances of the heater 17 are disconnected, the alarm lamp 14 is lighted to inform the driver of the abnormality while stopping the supply of electric current to the heater 17 (step 306), followed by the program proceeding to the step 302. On the other hand, if the answer to the question of the step 305 is affirmative (Yes), since the answer to the question of the step 304 is also affirmative, it is judged that the air-fuel mixture can be heated to a temperature high enough to be readily ignited, so that the driver is notified of completion of preheating of the fuel by an indicator, whereby he should start cranking by closing the starter switch. If the ECU 5 is supplied with a signal indicative of the closure of the starter switch from the starter switch sensor 13, cranking is started by the driver (step 307).

In this connection, the program may be constructed such that cranking is automatically started if the answer to the question of the step 305 is affirmative (Yes). Alternatively, the program may be also constructed such that the execution of the present program is started when the signal from the starter switch sensor 13 starts to be supplied to the ECU 5, but the starter 15 is inhibited from being actuated until the program reaches the step 307 or the step 302.

At the step 307, the fuel injection period $T_{OUT}$ is calculated by the equation (2), and fuel is supplied to the engine in an amount based on the calculated fuel injection period $T_{OUT}$ in accordance with driving of the starter 15 to thereby carry out cranking.

Figure 5:
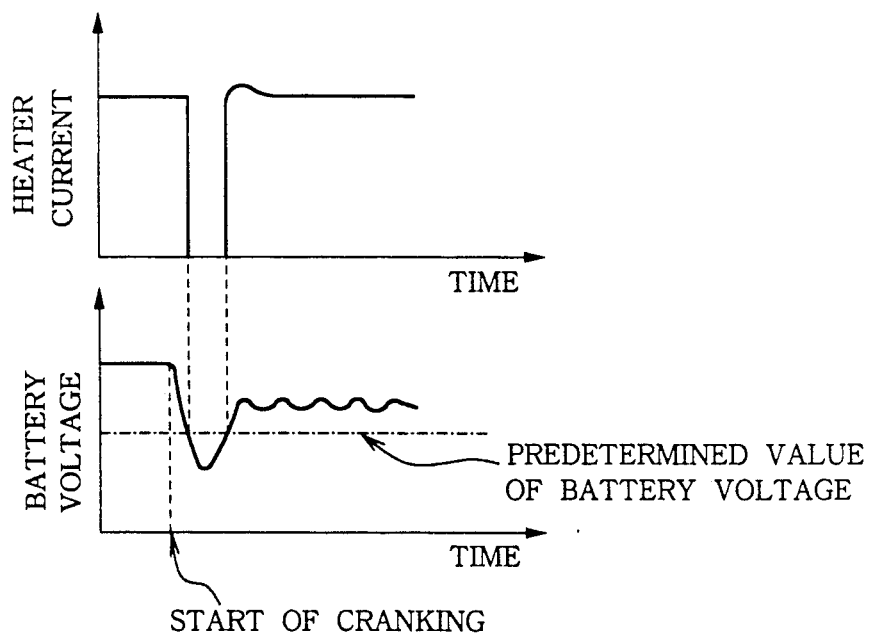
FIG. 5 is a graph showing the relationship between the battery voltage and the electric current supplied to the heater.

During cranking, as shown in FIG. 5, a large amount of electric power is consumed when the starter 15 starts to be operated, so that the battery voltage temporarily drops to a large degree. When the battery voltage is lower than a predetermined value, the supply of the heater current is inhibited in order to reduce the drop in the battery voltage to the minimum possible extent. More specifically, at a step 308, it is determined whether or not the battery voltage detected by the battery voltage sensor 11 is equal to or higher than a predetermined value. If the answer to this question is negative (No), i.e. if the battery voltage does not reach the predetermined value, the supply of heater current is stopped at a step 309, and the program returns to the step 307 to thereby continue cranking. If the answer to the question of the step 308 is affirmative (Yes), the program proceeds to a step 310.

At the step 310, it is determined whether or not the heater current is increasing during cranking. More specifically, if adherence of fuel to the heater 17 of the spark plug 16 or its peripheral parts occurs, the temperature of the heating resistances becomes lower so that the value of resistance of same becomes lower and hence the heater current increases. On the other hand, if no adherence of fuel to the heater 17 or its peripheral parts occurs, the temperature of the heating resistances becomes higher so that the value of resistance of same becomes higher and hence the heater current decreases. In view of these phenomena, at the step 310, it is determined based on a change in the amount of heater current whether or not adherence of fuel to the heater 17 or its peripheral parts occurs.

Figure 6:
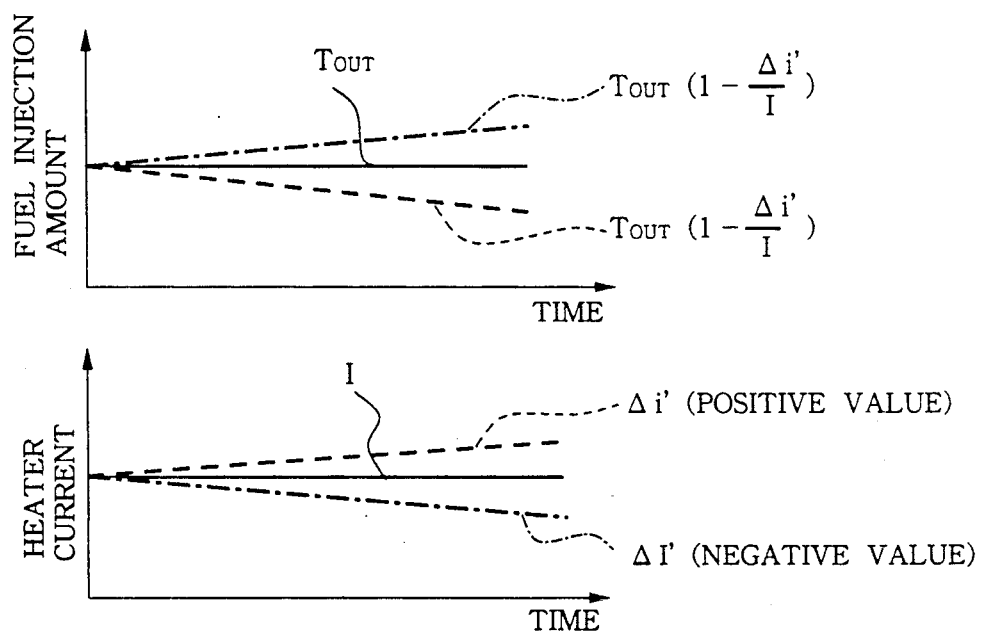
FIG. 6 is a graph showing the relationship between the electric current supplied to the heater and the amount of fuel injected.

If the answer to the question of the step 310 is affirmative (Yes), i.e. if the heater current is increasing, which means that adherence of fuel to the heater 17 or its peripheral parts occurs, the fuel injection period $T_{OUT}$ calculated at the step 307 is decreased in accordance with a rate of increase in the heater current at a step 311. On the other hand, if the answer to the question of the step 310 is negative (No), i.e. if the heater current is decreasing, which means that no fuel adheres to the heater 17 or its peripheral parts, or if the heater current is constant, which means that the fuel supply amount is appropriate, but it is required to promote ignition since fuel has not been ignited, the fuel injection period $T_{OUT}$ calculated at the step 307 is increased in accordance with the rate of increase in the heater current at a step 312. The increasing/decreasing control of the fuel supply amount will be described in further detail with reference to FIG. 6. Supposing that $\Delta i'$ represents an amount of change from a constant value I to which the heater current has progressively decreased before cranking ($\Delta i'$ assumes a positive value if the heater current is increasing, while it assumes a negative value if the heater current is decreasing), the fuel injection period $T_{OUT}$ is controlled to $T_{OUT}(1 - \Delta i'/I)$.

The control of the steps 310 to 312 may be carried out cylinder by cylinder, or for all the cylinders at the same time.

Then, at a step 313, it is determined whether or not the engine 1 has been started. This determination is carried out by determining whether or not the engine rotational speed Ne has exceeded a predetermined value, e.g. 400 rpm. If the answer to this question is negative (No), i.e. if the engine has not been started, the program returns to the step 307 to continue cranking. On the other hand, if the answer to the question is affirmative (Yes), the program proceeds to a step 314.

At the step 314, it is determined whether or not time having elapsed after completion of starting of the engine, which is counted by the time-counting means 5e, has exceeded a predetermined time period. If the answer to this question is negative (No), i.e. if the predetermined time period has not elapsed after completion of starting of the engine, the step 314 is repeatedly executed until the predetermined time period elapses, and when the answer to the question is affirmative (Yes), it is judged that firing of the air-fuel mixture is now being stably carried out, whereby the supply of heater current to the heater 17 is stopped at a step 315, and then the program proceeds to a normal mode control routine at a step 316. The normal mode control routine is based on a known fuel supply control method for normal operation of the engine, wherein the fuel injection period $T_{OUT}$ is calculated by the equation (1), and the fuel injection valves 6 are opened based on the calculated fuel injection period $T_{OUT}$.

In this embodiment, the CPU 5b only carries out or stops the supply of preheating current to the heater 17 without controlling the amount of preheating current. However, alternatively, a sensor for detecting the concentration in alcohol of the air-fuel mixture may be provided to control the amount of preheating current in response to the output from the sensor such that the preheating current is increased as the alcohol concentration is higher, to thereby promote atomization of the fuel.

In this embodiment, the heater 17 is arranged on each of the spark plugs. However, it may be arranged in the intake system including the fuel injection valves 6.

What is claimed is:

1. An air-fuel ratio control method of controlling the air-fuel ratio of an air-fuel mixture supplied to an internal combustion engine having spark plugs, and heaters for heating said air-fuel mixture in the vicinity of respective ones of said heaters, said air-fuel mixture containing a fuel which is poor in atomizing characteristic at a low temperature, the method comprising the steps of:
   (1) determining whether or not a temperature of said engine is lower than a predetermined value;
   (2) determining whether or not said engine is being cranked;
   (3) detecting an amount of electric current flowing through each of said heaters; and
   (4) controlling an amount of fuel supplied to said engine based on the detected amount of electric current when it is determined that said temperature of said engine is lower than said predetermined value and at the same time said engine is being cranked.

2. An air-fuel ratio control method according to claim 1, wherein the amount of said electric current flowing through said each heater varies in accordance with the amount of fuel adhering to said each heater.

3. An air-fuel ratio control method according to claim 1 or 2, wherein the amount of fuel supplied to said engine is decreased when the detected amount of electric current is increasing.

4. An air-fuel ratio control method according to claim 1, wherein before starting cranking of said engine, electric current is supplied to said each heater for preheating said air-fuel mixture in the vicinity of said each heater.

5. An air-fuel ratio control method according to claim 4, wherein the supply of electric current to said each heater is continued at least until said electric current flowing through said each heater becomes constant.

6. An air-fuel ratio control method according to claim 5, wherein after said electric current flowing through said each heater becomes constant, cranking of said engine is started when the amount of said electric current flowing through said each heater is equal to or larger than a predetermined value.

7. An air-fuel ratio control method according to claim 5, wherein if the amount of said electric current is smaller than said predetermined value after said electric current flowing through said each heater becomes constant, the supply of electric current to said each heater is stopped and a warning is given.

8. An air-fuel ratio control method according to claim 1 or 4, wherein said engine includes a starter, and a battery for supplying electric current to said each heater and said starter, and wherein when it is determined that said engine is being cranked, the supply of electric current to said each heater is inhibited if the voltage of said battery is lower than a predetermined value.

9. An air-fuel ratio control method according to claim 1 or 4, wherein the supply of electric current to said each heater is stopped when a predetermined time period has elapsed after completion of starting of said engine.

10. An air-fuel ratio control method according to claim 1 or 4, wherein said heaters are arranged on said spark plugs, respectively.

* * * * *